(12) United States Patent
Itoh et al.

(10) Patent No.: US 12,109,795 B2
(45) Date of Patent: Oct. 8, 2024

(54) LAYERED SHEET AND METHOD FOR MOLDING LAYERED SHEET MOLDED PRODUCT

(71) Applicant: Diatex Co., Ltd., Tokyo (JP)

(72) Inventors: Ken Itoh, Toyama (JP); Yohei Tanabe, Toyama (JP)

(73) Assignee: Diatex Co., Ltd., Tokyo (JP)

( * ) Notice: Subject to any disclaimer, the term of this patent is extended or adjusted under 35 U.S.C. 154(b) by 0 days.

(21) Appl. No.: 18/547,862

(22) PCT Filed: Mar. 4, 2022

(86) PCT No.: PCT/JP2022/009358
§ 371 (c)(1),
(2) Date: Aug. 24, 2023

(87) PCT Pub. No.: WO2022/186370
PCT Pub. Date: Sep. 9, 2022

(65) Prior Publication Data
US 2024/0092058 A1 Mar. 21, 2024

(30) Foreign Application Priority Data
Mar. 5, 2021 (JP) .................. 2021-035849

(51) Int. Cl.
*B32B 5/26* (2006.01)
*B29C 51/00* (2006.01)
(Continued)

(52) U.S. Cl.
CPC ............. *B32B 5/26* (2013.01); *B29C 51/004* (2013.01); *B29C 51/082* (2013.01);
(Continued)

(58) Field of Classification Search
CPC ....... B32B 5/26; B32B 27/12; B32B 2250/24; B32B 5/263; B32B 2255/02; B29C 51/004; B29C 51/145; D06M 17/04
See application file for complete search history.

(56) References Cited

U.S. PATENT DOCUMENTS

2020/0031035 A1* 1/2020 Mizushima ............. B32B 27/40
2022/0032558 A1* 2/2022 Tanaka .................... B32B 5/026

FOREIGN PATENT DOCUMENTS

JP 2001260290 9/2001
JP 2001293831 10/2001
(Continued)

OTHER PUBLICATIONS

JP2014-019981A translation (Year: 2014).*
International Search Report and Written Opinion dated Apr. 26, 2022 from IA PCT/JP2002/009358.

Primary Examiner — Jasper Saberi
(74) Attorney, Agent, or Firm — Crockett & Crockett, PC; K. David Crockett, Esq.

(57) ABSTRACT

A layered sheet product formed by layering a plurality of cloths comprised of thermoplastic resin strands and formed by layering a coating layer comprised of a thermoplastic resin onto at least one surface of the cloths, in which the thermoplastic resin is comprised of the same component as the strands and has a thickness of 0.02 mm or more and 1.0 mm or less, and a storage modulus of the coating layer at 150° C. is $3.00 \times 10^6$ Pa or higher and $1.00 \times 10^8$ Pa or lower, and a method for press molding the layered sheet and releasing the molded product after cooling to a range of 70° C. or more and 120° C. or less; and subsequently lowering the molded product temperature to 60° C. or lower.

19 Claims, 6 Drawing Sheets

(51) Int. Cl.
 *B29C 51/08* (2006.01)
 *B29C 51/14* (2006.01)
 *B32B 7/12* (2006.01)
 *B32B 27/12* (2006.01)
 *D06M 17/04* (2006.01)

(52) U.S. Cl.
 CPC .............. *B29C 51/145* (2013.01); *B32B 7/12* (2013.01); *B32B 27/12* (2013.01); *D06M 17/04* (2013.01); *B32B 2250/04* (2013.01); *B32B 2250/05* (2013.01); *B32B 2250/24* (2013.01); *B32B 2255/02* (2013.01); *B32B 2262/02* (2013.01); *B32B 2305/18* (2013.01); *B32B 2307/732* (2013.01)

(56) References Cited

FOREIGN PATENT DOCUMENTS

| | | | |
|---|---|---|---|
| JP | 2002067252 | 3/2002 | |
| JP | 2014019981 A * | 2/2014 | |
| JP | 2014218074 | 11/2014 | |
| JP | 2017196892 | 11/2017 | |
| WO | WO2018143476 | 8/2018 | |
| WO | WO-2020067535 A1 * | 4/2020 | ........... B29C 70/026 |

* cited by examiner

LAYERED SHEET AND METHOD FOR MOLDING LAYERED SHEET MOLDED PRODUCT

TECHNICAL FIELD

The present invention relates to a layered sheet and a method for molding a layered sheet molded product, and in particular, relates to a layered sheet and a method for molding a layered sheet molded product having excellent molding cycle time.

BACKGROUND

Patent Document 1 discloses a technique for producing a plate-like sheet by preparing a plurality of sets of woven fabrics having coating layers in which coating layers (laminated sheets) are formed on both sides of the woven fabric, and thermocompression-bonding the woven fabrics having the coating layer at a temperature of equal to or higher than the melting point of a thermoplastic polymer and lower than the melting point of the woven fabric so that the woven fabrics are not adjacent.

This allows the coating layers of adjacent laminated sheets to be welded to each other and thus the strength of the molded product to be improved. The thus obtained molded product is suitable for cases such as suitcases having excellent impact resistance and tensile strength and moderate rigidity.

PRIOR ART DOCUMENTS

Patent Documents

Patent Document 1: JP-A-2014-218074

SUMMARY OF THE INVENTION

Problem to be Solved by the Invention

However, in the technology described in Patent Document 1, there has been a problem of occurrence of coating layer floating at the time of mold release when a cloth layered sheet is press-molded at a temperature of 150° C. to 170° C., the mold is opened at a temperature of 70° C. to 120° C., and mold release is performed.

In order to prevent the coating layer floating at the time of mold release, the mold release is required to be performed by cooling to 60° C. or lower.

However, if this cooling has to be performed, the subsequent molding cycle cannot be started until cooled to 60° C. or lower. This causes the disadvantage of excessive time of the molding cycle.

An object of the present invention is to provide a layered sheet and a method for molding a layered sheet molded product having excellent molding cycle time in which mold release can be performed without waiting for the molded product to be cooled to 60° C. or lower and the subsequent molding cycle can be started.

Other objects of the present invention will be revealed by the following descriptions.

Means for Solving Problem

The above objects are fulfilled by each of the following inventions.

(1) A layered sheet
formed by layering a plurality of cloths comprised of thermoplastic resin strands and
formed by layering a coating layer comprised of a thermoplastic resin onto at least one surface of the cloths, wherein
the thermoplastic resin is comprised of the same component as the strands and has a thickness of 0.02 mm or more and 1.0 mm or less, and
a storage modulus of the coating layer at 150° C. is $3.00 \times 10^6$ Pa or higher and $1.00 \times 10^8$ Pa or lower.

2. The layered sheet according to 1, wherein the cloths are formed by layering through an adhesion layer comprised of the same component as the cloths.

3. The layered sheet according to 1 or 2, wherein a top layer comprised of a thermoplastic resin having a thickness of 0.02 mm or more and 0.1 mm or less is layered onto an upper surface of the one coating layer.

4. The layered sheet according to 1 or 2, wherein a top layer comprised of a thermoplastic resin having a thickness of 0.02 mm or more and 0.1 mm or less is layered onto an upper surface of the one coating layer through an adhesive layer.

5. A method for producing a layered sheet molded product, the method comprising:
press-molding the layered sheet according to any one of 1 to 4 using a male-female mold press machine;
subsequently mold-releasing a molded product obtained by the molding at a molded product temperature in a range of 70° C. or higher and 120° C. or lower; and
subsequently lowering the molded product temperature to 60° C. or lower.

6. The method for producing a layered sheet molded product according to 5, wherein the lowering the molded product temperature to 60° C. or lower is performed in a state of retaining a shape along a correction mold.

7. The method for producing a layered sheet molded product according to 5, wherein the lowering the molded product temperature to 60° C. or lower is performed while the molded product is being attached to a male mold of the male-female mold press machine.

Effect of the Invention

The present invention can provide a layered sheet and a method for molding a layered sheet having excellent molding cycle time in which mold release can be performed without waiting for the molded product to be cooled to 60° C. or lower and the subsequent molding cycle can be started.

DESCRIPTION OF THE EMBODIMENTS

Hereinafter, preferred embodiments of the present invention will be described.

1. Layered Sheet

Figure 1:
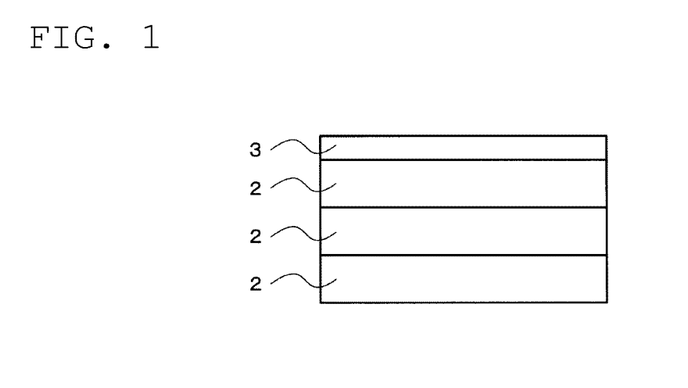
FIG. 1 is a schematic cross-sectional view showing an example of a layered sheet according to the present invention.
Figure 2:
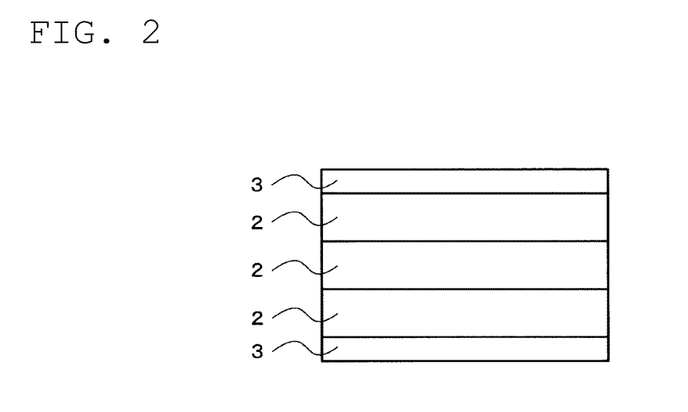
FIG. 2 is a schematic cross-sectional view showing another example of the layered sheet according to the present invention.

FIG. 1 is a schematic cross-sectional view showing an example of a layered sheet in which a coating layer 3 is layered on one side of a plurality of layered cloths 2, and FIG. 2 is a schematic cross-sectional view showing an improved example of FIG. 1 in which coating layers 3 and 3 are layered on both sides of a plurality of layered cloths 2.

In the present invention, the layered sheet according to the present invention is obtained by layering a plurality of cloths 2 comprised of thermoplastic resin strands 1, layering a coating layer 3 on at least one side of the cloths, and thermocompression-bonding and integrating them.

Strand

The strand 1 is constituted of a high-melting point resin component having a melting point higher than the temperature at the thermocompression bonding as a main component and can include a low-melting point resin component having a melting point lower than the temperature at the thermocompression bonding.

Figure 3:
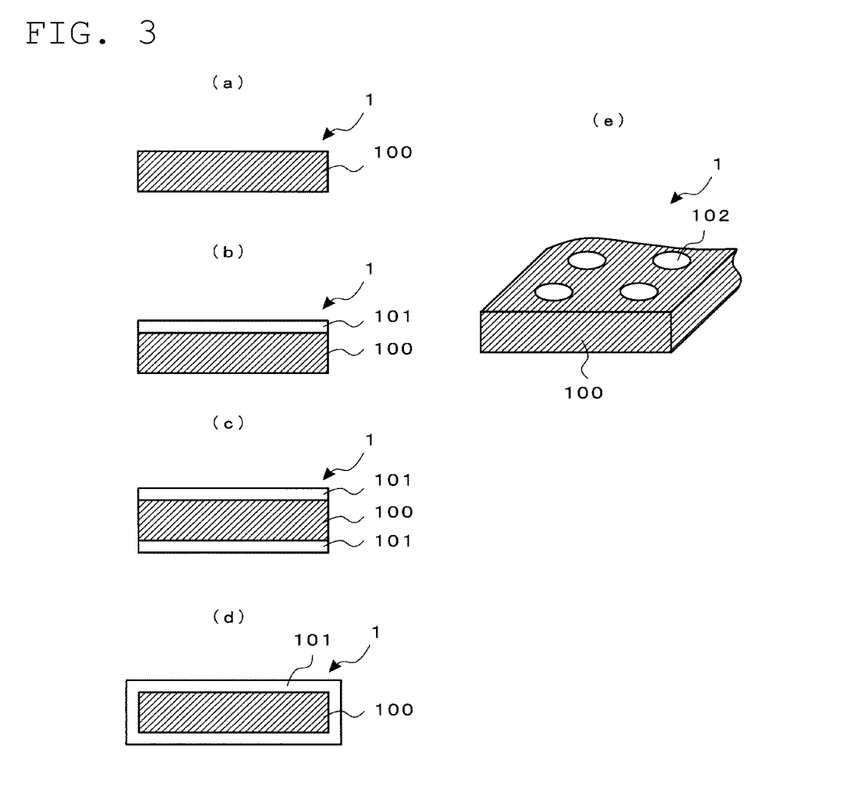
FIGS. 3(a) to 3(e) are views showing examples of the structure of a strand.

As the structure of the strand, an aspect as shown in FIG. 3 can be exemplified. FIG. 3(a) is an example in which the strand 1 is a single layer of a base layer 100 alone. In the case of this example, the resin constituting the strand is constituted of the high-melting point resin component and may include the low-melting point resin component within a range not impairing the effect of the present invention. FIGS. 3(b) and 3(c) show examples of layering structures in which, in the strand 1, a surface layer 101 comprised of the thermoplastic resin having a lower melting point than that of the base layer 100 is layered on one surface or both surfaces of the base layer 100. FIG. 3(d) is an examples of a sheath-core structure in which the surface layer 101 comprised of the thermoplastic resin having a lower melting point than that of the base layer 100 surrounds the surrounding of the base layer 100. FIG. 3(e) shows an example of a sea-island structure, in which parts assigning 102 are low melting point parts.

Preferable examples of the thermoplastic resin constituting the strand include polyolefin such as polypropylene and polyethylene and polyester such as polyethylene terephthalate. Of these thermoplastic resins, polypropylene is particularly suitable.

When the layered structure is used as the strand 1, a means for molding a layered film serving as a molding material can be appropriately selected and used from means such as:

(1) a means for previously forming a film to be the base layer 100 and a film to be the surface layer 101 and layering the films using a dry laminate method or a heat laminate method;

(2) a means for coating the thermoplastic resin to be the surface layer 101 on a surface of a film to be the base layer 100;

(3) a means for extrusion-laminating the surface layer 101 on a previously formed film to be the base layer 100; and (4) a means for extrusion-molding a layered film by a multilayer coextrusion method.

Stretched strands 1 can be obtained by stretching a film to be the base layer 100, for instance, in a uniaxial direction, thereafter layering a thermoplastic resin to be the surface layer 101, and slitting the layered product to form a tape-like product.

Alternatively, the strands 1 can also be obtained by slitting a layered film obtained by layering the base layer 100 and the surface layer 101 and thereafter stretching the layered film in the uniaxial direction.

The method for stretching the films is not specifically restricted, and a film can be stretched by single- or multi-stage stretching using a heated roll, a hot plate, a hot air furnace, hot water, hot oil, steam, infrared radiation, or the like.

The thickness of the strand can be appropriately selected depending on intended purposes. In general, the thickness is desirably in the range of 50 dtex (dt) to 10,000 dtex (dt) in the case of the layering structure, whereas the thickness is desirably in the range of 1 dtex (dt) to 10,000 dtex (dt) in the case of the sheath-core structure (enclosed structure) as shown in FIG. 3(d).

The stretched strand is not specifically restricted so long as the strand is stretched yarns of semi-crystalline thermoplastic polymers, and examples include multifilaments, monofilaments, flat monofilaments, flat yarns, and slit yarns. The multifilaments, monofilaments and flat monofilaments have the disadvantage of inferior surface smoothness of the molded product, and thus the flat yarns and the slit yarns are preferably used.

Cloth

The cloth 2 used in the present invention is preferably a woven fabric by weaving (for instance, plain weave, twill weave, satin weave, tangle weave, and derivative weave) using the strands 1 and may be a cross-bonded cloth formed by orthogonally arranging a great number of strands 1 comprised of thermoplastic resin side by side to form a planer object and joining the resulting intersections, or a knitting comprised of the strands 1 comprised of the thermoplastic resins mentioned above.

The basis weight of the woven fabric is preferably 30 g/m$^2$ to 500 g/m$^2$ and more preferably from 50 g/m$^2$ to 400 g/m$^2$.

In order to maintain the strength of the molded product, the desirable weave density of the woven fabric is 5 warp yarns or more per inch and 5 weft yarns or more per inch. The upper limit of the weave density varies depending on the type of the yarn and is not specifically restricted and is preferably 5 yarns/inch to 30 yarns/inch.

Coating Layer

In FIG. 1, the coating layer 3 is provided on one side of the layered cloths 2. In FIG. 2, the coating layers 3 are provided on both sides of the layered cloths 2.

The coating layer according to the present invention has characteristics in that a storage modulus at 150° C. is $3.00\times10^6$ Pa or higher and $1.00\times10^8$ Pa or lower.

The storage modulus of the coating layer can be measured, for instance, using a measuring apparatus (EPLEXOR 500N (manufactured by NETZSCH GABO Instruments GmbH): dynamic viscoelasticity, temperature distribution measurement).

For the coating layer 3, a film comprised of the same material as the material of the cloth is preferable. Films comprised of, for instance, polyolefin such as polypropylene and polyethylene, polyester such as polyethylene terephthalate, and polyamide may be preferably used. Of these materials, polyolefin is preferable and polypropylene is more preferable.

The coating layer 3 having the storage modulus within the range of the present invention exhibits excellent effect for molding cycle time in which mold release can be performed without waiting for the molded product to be cooled to 60° C. or lower and the subsequent molding cycle can be started.

The coating layer 3 can be formed on both sides or one side of the cloths 2 (woven fabrics) by known extrusion lamination methods, thermal lamination methods, calendering methods, coating methods, dipping methods, or other methods.

The thickness of the coating layer 3 is 0.02 mm or more and 1.0 mm or less. A coating layer having a thickness of thinner than 0.02 mm has the disadvantage of being difficult to produce, whereas a coating layer having an excessively thick thickness impairs lightweight properties.

In the present invention, the resin components constituting the strand 1 and the coating layer 3 are preferably the same component. The same component described here means that the polypropylene resin component is included in common.

Adhesion Layer

Figure 4:
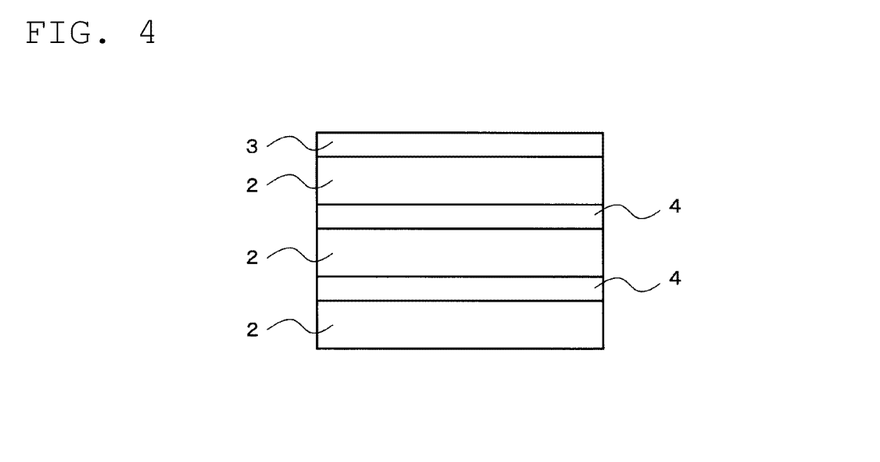
FIG. 4 is a schematic cross-sectional view showing further another example of the layered sheet according to the present invention.
Figure 5:
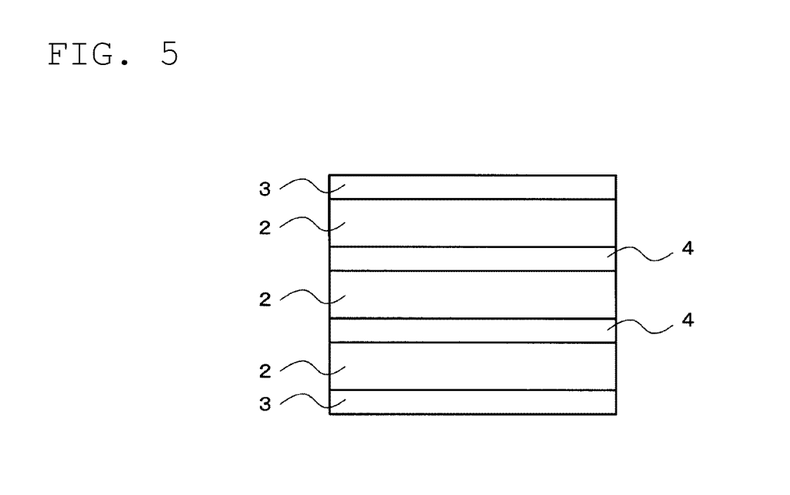
FIG. 5 is a schematic cross-sectional view showing further another example of the layered sheet according to the present invention.

As shown in FIG. 4 and FIG. 5, the layered sheet is preferably layered in a manner that an adhesion layer 4 comprised of the same component as the cloth 2 is disposed between the cloth 2 and an adjacent cloth 2. The same components included in the cloth 2 and the adhesion layer 4 preferably include a polypropylene resin component in common.

The adhesion layer 4 is disposed between the cloth 2 and the cloth 2 and adheres between these cloth 2 and cloth 2. The presence of this adhesion layer 4 provides a function for improving the rigidity of the obtained layered sheet.

The adhesion layer 4 is preferably a film constituted of a thermoplastic resin. As this thermoplastic resin, a product in which the low-melting point resin component contains the high-melting point resin component can be used. The thermoplastic resin containing the high-melting point resin component in the low-melting point resin component allows the adhesion layer to function as a rigidity improving layer.

In this specification, the term "melting point" refers to a temperature measured with differential scanning calorimetry (DSC) measurement as a melting peak temperature.

In other words, the high-melting point resin component and the low-melting point resin component have relation in which the high-melting point resin component has a higher melting peak temperature than that of the low-melting point resin component. The adhesion layer 4 may show two melting peak temperatures originated from these resins.

Preferable examples of the low-melting point resin component used in the adhesion layer 4 include polyolefin such as polypropylene and polyethylene and polyester such as polyethylene terephthalate. Of these thermoplastic resins, polyolefin is preferable and polypropylene is more preferable.

As the high-melting point resin component used for the adhesion layer 4, a component having a higher melting point than that of the low-melting point resin component may be used. Preferable examples of the high-melting point resin component include polyolefin such as polypropylene and polyethylene and polyester such as polyethylene terephthalate. Of these thermoplastic resins, polypropylene is particularly suitable.

When each of the low-melting point resin component and the high-melting point resin component used in the adhesion layer 4 is selected from polypropylene, for instance, random polypropylene is used as the low-melting point resin component and homo polypropylene is used as the high-melting point resin component. In another aspect in which each of the low-melting point resin component and the high-melting point resin component used in the adhesion layer 4 is selected from polypropylene, random polypropylene having relatively low melting point may be used as the low-melting point resin component and random polypropylene having relatively high melting point may be used as the high-melting point resin component.

The random polypropylene is a randomly copolymerized product of propylene as the monomer components and α-olefin (for instance, α-olefin other than propylene such as ethylene, 1-butene, 1-pentene, 1-hexene, 4-methyl-1-pentene, 1-heptene, and 1-octene).

The α-olefin can be preferably used, for instance, in a ratio of 20% by weight or lower and more preferably in a ratio of 10% by weight or lower relative to the total monomer component. The ratio of the α-olefin can be adjusted so as to exhibit a desired melting point.

As mentioned above, the melting point of the random polypropylene can be set by, for instance, adjusting the ratio of the α-olefin. Specifically, for instance, random polypropylene having a lower α-olefin ratio than the ratio of the random polypropylene used as the low-melting point resin component can be used as the high-melting point resin component.

As the adhesion layer 4, a film formed by kneading the pellets of the low-melting point resin component and the pellets of the high-melting point resin component at a temperature higher than the melting points of both resin components and molding the kneaded resin components by inflation molding can be used.

In the adhesion layer 4, the content of the high-melting point resin component is, for instance, preferably in the range of 5% by weight to 50% by weight and further preferably in the range of 10% by weight to 30% by weight.

The weight ratio of the low-melting point resin component and the high-melting point resin component in the adhesion layer 4 is preferably in the range of 5:95 to 50:50 and further preferably in the range of 10:90 to 30:70.

The thickness of the adhesion layer 4 is not restricted because the thickness can be appropriately set depending on, for instance, the thickness of the cloth and the thickness of the strand constituting the cloth, and is preferably in the range of 10 μm to 500 μm, and further preferably in the range of 20 μm to 300 μm.

In the example shown in FIG. 4, three cloths 2 are layered and have the coating layer 3 on the surface. Specifically, this is an example of a layered sheet comprised of coating layer 3/cloth 2/adhesion layer 4/cloth 2/adhesion layer 4/cloth 2.

At the time of the thermocompression bonding of the cloth layered sheet, the low-melting point resin component constituting the surface layer of the strands used for the cloth is melted to integrate the cloths with each other by the thermocompression bonding. At this time, the remaining strand component comprised of the high-melting-point resin component remains as the fiber component of the cloth. This provides the action of enhancing the strength of the molded product, which is preferable.

The example in FIG. 5 is an example of a layered sheet composed of coating layer 3/cloth 2/adhesion layer 4/cloth 2/adhesion layer 4/cloth 2/coating layer 3. The difference from the aspect of FIG. 4 is that in FIG. 5, the undermost layer has the coating layer 3.

Alternately layering the cloth (woven fabric) and an adhesive film facilitates layering.

The number of woven fabrics is preferably 2 to 20, and more preferably 2 to 10. The number of woven fabrics can be selected depending on the intended purpose and use of the molded product and the layering direction is also arbitrary. From the viewpoint of providing moderate strength (rigidity) and impact resistance to the molded product, at least two or more woven fabrics are preferably used.

In the layered sheet according to this embodiment, layers between the coating layer and the cloth as well as the cloth and the adjacent cloth tightly adhere in a manner that the polymer constituting the coating layer is heated until the polymer becomes soft or a part of the polymer melts by the thermocompression bonding and thus the coating layers of the laminated sheet are welded to each other or the coating layer is softened to penetrate into a woven fabric or to weld to the woven fabric to integrate as well as the overlap of the cloth and the adhesion film is heated to a temperature equal to or higher than the melting point of the film and lower than the melting point of the cloth, that is, a temperature at which the polymer constituting the adhesion film is softened or a part of the polymer melts, to integrate the cloth and the adhesion film.

The thermocompression bonding method for forming the layered sheet is not specifically restricted. Known extrusion lamination molding methods, thermal lamination methods, calendaring molding methods, press molding methods, or other methods can be employed.

The layered sheet is preferably prepared by the thermocompression bonding prior to molding the molded product having a predetermined shape. In this case, the thermocompression bonding temperature is desirably set to a temperature lower than the melting point of the polymer in order not to decrease the crystallization of the polymer constituting the stretched strand. For instance, when the polymer constituting the coating layer is polyethylene, the thermocompression bonding temperature is preferably about 115° C. to about 125° C. When the polymer constituting the coating layer is polypropylene, the thermocompression bonding temperature is preferably about 115° C. to about 165° C.

Figure 6:
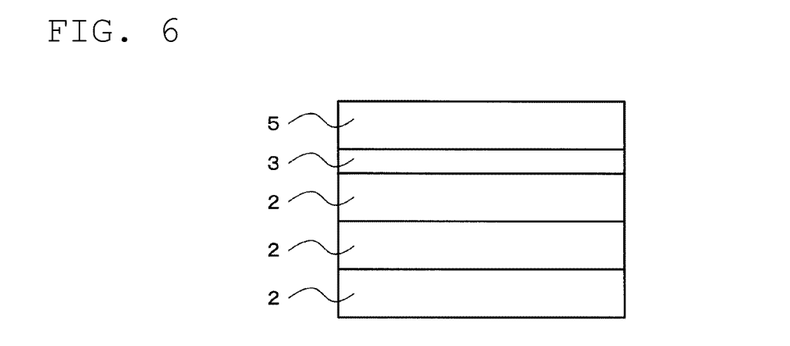
FIG. 6 is a schematic cross-sectional view showing further another example of the layered sheet according to the present invention.

Improved examples of the layered sheet shown in FIG. 1, FIG. 2, FIG. 4, and FIG. 5 shown above will be described with reference to FIG. 6, FIG. 7, and FIG. 8.

These improved examples include an aspect in which a top layer comprised of a thermoplastic resin having a thickness of 0.02 mm or more and 0.1 mm or less is layered to the upper surface of one coating layer mentioned above.

As a top layer 5, a layer comprised of the same material as the materials of the cloth and the coating layer is preferable. Examples include an unstretched polypropylene film, a biaxially oriented polypropylene film, an unstretched polyethylene film, a polyester film, and a polyamide film. Of these films, the unstretched polypropylene and the biaxially oriented polypropylene are preferable and the biaxially oriented polypropylene is more preferable.

In this embodiment, the top layer 5 may be colored. As a method for coloring the top layer 5, the top layer 5 itself may be colored with pigments or paint or a colored printing layer may be provided on the coating layer 3 side of the top layer 5.

Figure 7:
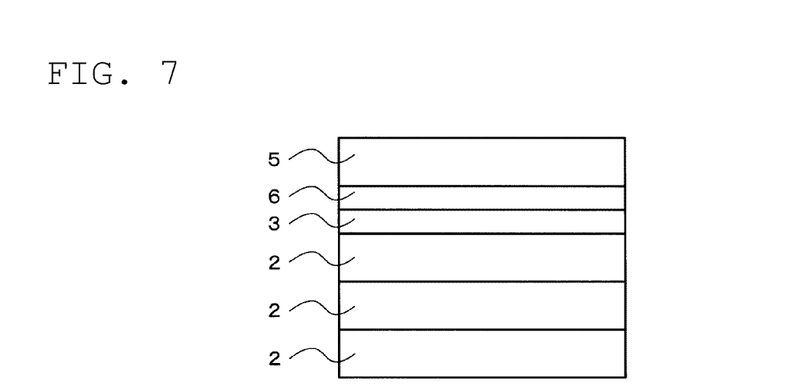
FIG. 7 is a schematic cross-sectional view showing further another example of the layered sheet according to the present invention.

In this improved example, as shown in FIG. 7, the top layer 5 comprised of a thermoplastic resin having a thickness of 0.02 mm or more and 0.1 mm or less is preferably layered to the upper surface of the one coating layer 3 through an adhesive layer 6.

The adhesive layer 6 is preferably an adhesive layer formed using at least one adhesive selected from acrylic adhesives, urethane-based adhesives, epoxy-based adhesives, vinyl acetate-based adhesives, styrene-butadiene rubber-based adhesives, and silicone-based adhesives.

A method for providing the adhesive layer 6 is not specifically restricted and examples of the method include spraying, dip coating, and brush coating.

Figure 8:
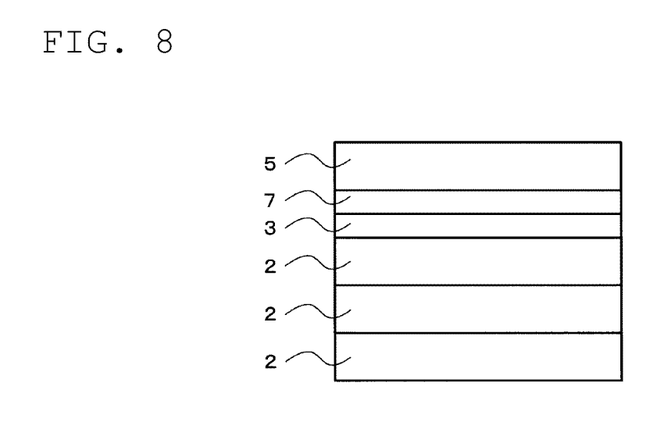
FIG. 8 is a schematic cross-sectional view showing further another example of the layered sheet according to the present invention.

As shown in FIG. 8, the coating layer 3 and the top layer 5 are also preferably layered in sequence through a polar group-containing thermoplastic resin layer 7. The feature of the aspect shown in FIG. 8 is that the coating layer 3 and the top layer 5 are layered in sequence through the polar group-containing thermoplastic resin layer 7.

The polar group-containing thermoplastic resin layer 7 is useful when tighter interlayer adhesion with the top layer 5 is desired. Compared to the case where the adhesive layer 6 is formed and the top layer 5 is layered after a layered sheet pre-product is once formed when the adhesive layer 6 is formed using the adhesive, the case where the polar group-containing thermoplastic resin layer 7 is used is useful because this allows the layered sheet to be formed as a whole without forming the layered sheet pre-product.

The polar group-containing thermoplastic resin layer 7 is preferably a resin layer formed using modified polyolefin and the modified polyolefin is preferably acid-modified polyolefin modified using organic acids having carboxyl groups.

When polar group-containing thermoplastic resin layer 7 is a resin layer formed using the modified-polyolefin (hereinafter, referred to as a modified-polyolefin layer 7, if necessary), at least one modified-polyolefin selected from acid-modified polypropylene and acid-modified polyethylene may be used.

The polyolefin may be a homopolymer or a copolymer. As the monomer of the polyolefin, ethylene and propylene can be exemplified. These monomers may be used singly or in combination of two or more of the monomers. The copolymer may be any one of random copolymer, alternating copolymer, block copolymer, or graft copolymer. In this aspect, these polymers can be used singly or in combination of two or more of the polymers. Of these polymers, polypropylene and polyethylene are particularly preferably used as the polyolefin.

Examples of methods for modifying the polyolefin include a method for acid modification. As the method for acid modification, a method for graft-polymerizing an organic acid having a carboxy group to the polyolefin can be used.

Such graft polymerization allows the acid-modified polyolefin in which an organic acid component is grafted to the polyolefin is obtained. The method for polymerization is not restricted to the graft polymerization and any methods can be appropriately selected and used.

Types of the organic acid are not specifically restricted and a saturated or unsaturated carboxylic acid or carboxylic anhydride having at least one or more carboxy groups is preferable.

Examples of the organic acid include:
(1) carboxylic acids such as maleic acid, fumaric acid, mesaconic acid, citraconic acid, itaconic acid, aconitic acid, crotonic acid, succinic acid, oxalic acid, malonic acid, malic acid, thiomalonic acid, tartaric acid, adipic acid, citric acid, pimelic acid, suberic acid, azelaic acid, acrylic acid, tetrahydrophthalic acid, isocrotonic acid, endo-cis-bicyclo(2.2.1)hept-5-ene-2,3-dicarboxylic acid, and sebacic acid; and
(2) carboxylic anhydrides such as maleic anhydride, itaconic anhydride, citraconic anhydride, and succinic anhydride.

The organic acids may be used singly or may be used in combination of two or more of the organic acids.

When the modified polyolefin is produced by acid modification, the polyolefin can usually be modified so that an organic acid may be contained in a ratio of 0.01% by weight to 10% by weight relative to the polyolefin.

When the content of the organic acid is smaller than 0.01% by weight, the interlayer adhesion is poor when the modified-polyolefin layer 7 is layered between the cloth 2 and a copolymerized polyamide layer, which is unfavorable. When the content of the organic acid is larger than 10% by weight, a melt viscosity increases because significant crosslink of the polyolefin is generated when the polyolefin containing a molecular crosslink-type monomer as the main component is modified and the melt viscosity decreases because the significant main chain cleavage occurs when the polyolefin containing a molecular cleavage-type monomer as the main component is modified. As a result, the interlayer adhesion becomes poor when the modified-polyolefin layer 7 is layered between the cloth and the copolymerized polyamide layer.

The resin layer comprised of the modified-polyolefin may include other resins such as non-modified polyolefin in addition to the modified polyolefin mentioned above within a range not impairing the effect of the present invention.

The form of the resin layer comprised of the modified-polyolefin is not specifically restricted. For instance, the form may be a film-like form or a sheet-like form and a state where the modified polyolefin is melted in order to be provided for, for instance, extrusion laminating. From the viewpoint of versatility, the form is preferably the film-like form or the sheet-like form.

2. Method for Molding Layered Sheet Molded Product

Subsequently, the method for molding the layered sheet molded product will be described with reference to FIG. 9.

FIG. 9(A) shows a pressing process.

A male-female mold press machine comprised of a female mold 81 and a male mold 82 is used as a press machine 8.

Figure 9:
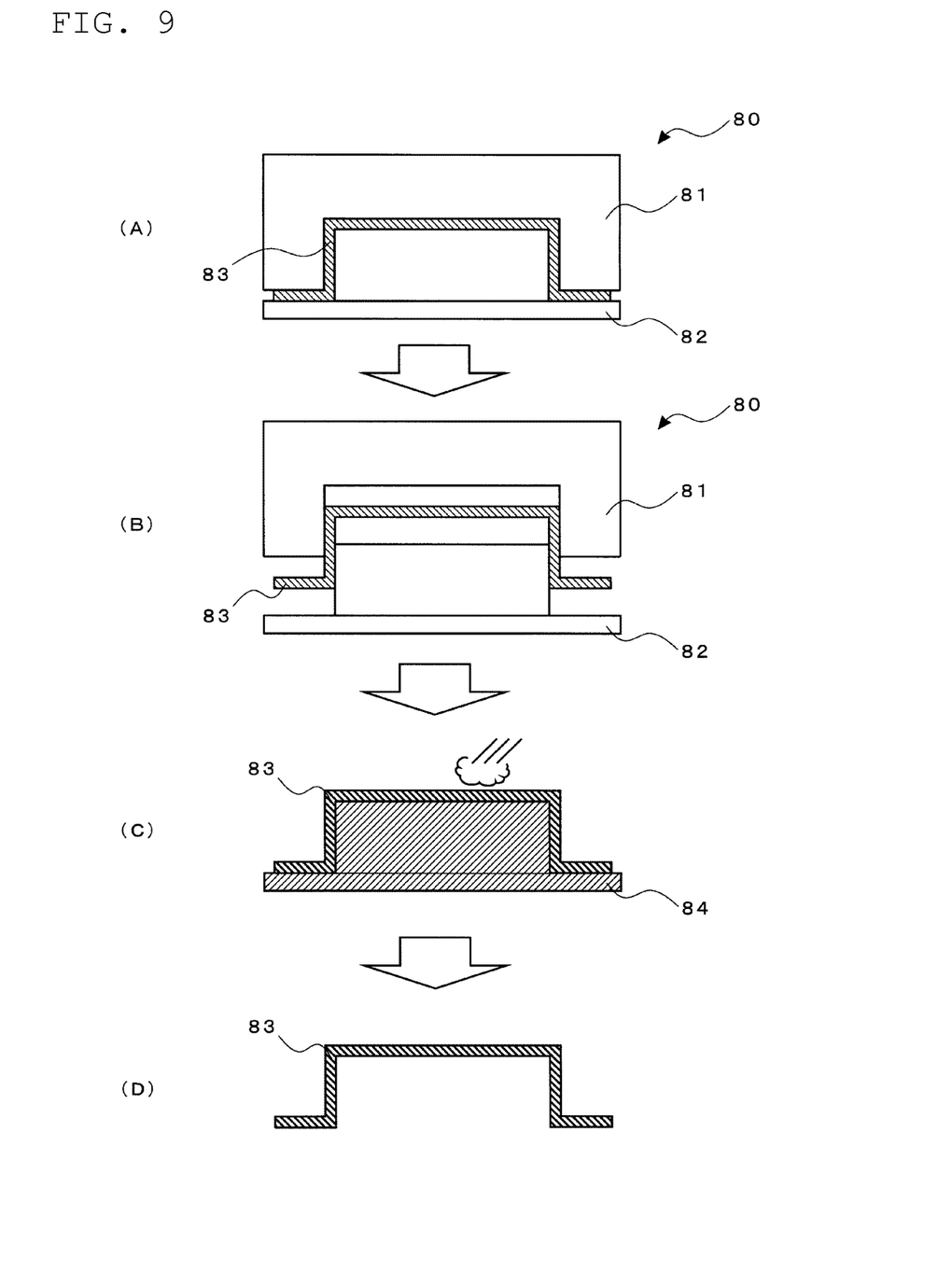
FIGS. 9(A) to 9(D) are views showing an example of a method for molding a layered sheet molded product according to the present invention.

In the example shown in FIG. 9, a layered sheet 83 mentioned above is disposed between the female mold 81 and the male mold 82 and press molding is performed at a temperature of a molded product of 150° C. to 170° C. in the press machine 8.

After the specified time has elapsed, the press molding is terminated. Mold opening as shown in FIG. 9(B) is performed and the mold release is performed at a molded product temperature of the molded product obtained by molding in the range of 70° C. or higher and 120° C. or lower.

When the storage modulus of the coating layer is lower than the range of the present invention, the coating layer floating occurs at the time of mold release. Therefore, conventionally, mold release is required to be performed to wait for the molded product to be cooled to 60° C. or lower. In other words, the mold release cannot be performed until the molded product is cooled to 60° C. or lower and the subsequent pressing operation cannot be performed, and thus a problem of significant loss of molding cycle arises.

In the present invention, however, the storage modulus of the coating layer is within the range of the present invention, and thus the floating of the coating layer at the time of mold release does not occur.

Therefore, as shown in FIG. 9(C), the molded product temperature can be cooled to 60° C. or lower in the present invention.

In the present invention, when the molded product temperature is cooled to 60° C. or lower, the cooling can be performed while the shape is being retained along a correction mold 84.

As another aspect, the lowering the molded product temperature to 60° C. or lower can be performed while the molded product is being attached to the male mold 82 of the male-female mold press machine.

As the floating of the coating layer at the time of mold release does not occur, the molding cycle can smoothly proceed and the layered sheet molded product can be completed as shown in FIG. 9(D) because there is no obstacle at the time of mold release and the lowering of the molded product temperature to 60° C. or lower.

Even when the top layer is formed on the coating layer, the top layer and the coating layer tightly adhere and the top layer does not float at the time of the mold release of the molded product comprised of the layered sheet including the top layer. Consequently, there is no obstacle at the time of mold release and the lowering of the molded product temperature to 60° C. or lower, and thus the molding cycle can smoothly proceed.

EXAMPLES

Examples of the present invention will be described below, but the present invention is not restricted to these Examples.

Example 1

Preparation of Layered Sheet (1) Preparation of Cloth

Production of Polypropylene Film Including Three Layers Using Two Types of Polypropylene Using high melting point polypropylene (MFR=0.4 g/10 min, weight average molecular weight Mw=630,000, and melting point 164° C.) and low melting point polypropylene (propylene-ethylene random copolymer, MFR=7.0 g/10 min, weight average molecular weight Mw=220,000, and melting point 125° C.), a polypropylene film including three layers using two types of polypropylene in which the low-melting-point polypropylene was served as the surface layer and the high-melting-point polypropylene was served as the inner layer was produced by an inflation molding method.

Production of Flat Yarn

The obtained film was slit with a razor. Subsequently, the film was stretched 7 times on a hot plate at a temperature of 110° C. to 120° C. and thereafter subjected to 10% relaxation heat treatment in an oven with internal air circulation at a temperature of 145° C. to obtain a flat yarn having a yarn width of 4.5 mm and a fineness of 1,700 dtex (dt).

Production of Cloth

The obtained flat yarn was twill-weaved (15 warps/25.4 mm and 15 wefts/25.4 mm) using a Sulzer weaving machine to obtain a cloth.

(2) Adhesion Layer

As an adhesion layer, a polypropylene film having a thickness of 0.6 mm in which high melting point polypropylene having a melting point of 161° C. was contained in low-melting point polypropylene having a melting point of 125° C. was used.

(3) Coating Layer

As the coating layer, 55% by weight of polypropylene (PP A) (propylene-ethylene random copolymer, MFR=2.0 g/10 min, and density=0.90 g/ml) and 45% by weight of polypropylene (PP C) (homo polypropylene, MFR=0.5 g/10 min, and density=0.90 g/ml) were blended and the blended polypropylene was melted to mold a film, resulting in producing a polypropylene film having a thickness of 110 μm.

The same polypropylene film as the produced polypropylene film was prepared, test specimens were made, and storage modulus at 150° C. was measured using the following measurement apparatus (dynamic viscoelasticity, temperature distribution measurement). These results are listed in Table 1.

Measurement Apparatus

Apparatus name: EPLEXOR500N (manufactured by NETZSCH GABO Instruments GmbH)
Measurement mode: Tensile mode
Frequency: 1 Hz
Environment: Under $N_2$
Temperature range: −20° C. to 180° C.
Temperature rising rate: 2° C./min (4) Production of Layered Sheet Three of the obtained cloths and two of the obtained adhesion layers were alternately layered so that the layers were cloth/adhesion layer/cloth/adhesion layer/cloth, and the obtained coating layer was provided onto the upper surface of the cloth.

The layer constitution was constituted as coating layer/cloth/adhesion layer/cloth/adhesion layer/cloth.

The product having this layer constitution was hot-pressed with an oil hydraulic press machine the press temperature of which was set to 145° C. at a pressure of 1 MPa for 2 minutes and thereafter cold-pressed with an oil hydraulic press machine at a press temperature of 20° C. and a pressure of 5 MPa for 2 minutes to obtain an integrated layered sheet of Example 1.

Example 2

The layered sheet of Example 2 was obtained in the same manner as the manner in Example 1 except that the polypropylene film (PP C) serving as the coating layer in Example 1 was replaced with polypropylene (PP D) (ethylene-propylene block copolymer, MFR=2.1 g/10 min, and density=0.90 g/ml).

Comparative Example 1

The layered sheet of Comparative Example 1 was obtained in the same manner as the manner in Example 1 except that the content of the polypropylene (PP A) was changed to 70% by weight, the polypropylene (PP C) used for the coating layer in Example 1 was replaced with polypropylene (PP B) (homo polypropylene, MFR=2.0 g/10 min, and density=0.90 g/ml), and the content in Example 1 was changed to 30% by weight.

Comparative Example 2

The layered sheet of Comparative Example 2 was obtained in the same manner as the manner in Example 1 except that the polypropylene (PP C) in Example 1 was replaced with the polypropylene (PP B) and the content was set to 45% by weight.

Production Test of Molded Product

In a state where the outer circumference of the layered sheets of Example 1, Example 2, Comparative Example 1, and Comparative Example 2 obtained as mentioned above was gripped, the surface of the layered sheet was heated until the temperature was reached to 160° C. by an infrared heater, thereafter the layered sheet was press-molded with a mold heated to 80° C., and the mold was closed for 2 minutes. Thereafter, the mold was opened and mold release was performed to obtain a molded product.

Temperature at the Time of Mold Release

The temperature of the molded product at the time of mold release was measured. The results are listed in Table 1.

Evaluation of Appearance after Mold Release

With respect to the molded products at the time of mold release, appearance after mold release was evaluated by the following criteria. The results are listed in Table 1.

○: Molded products having excellent surface appearance was possible to be obtained without the occurrence of the coating layer floating.

x: The coating layer floating occurred and the molded product having a distorted appearance was obtained.

TABLE 1

| | PP A (% by weight) | PP B (% by weight) | PP C (% by weight) | PP D (% by weight) | Storage modulus at 150° C. (Pa) | Thickness of coating layer (μm) | Temperature at mold release (° C.) | Appearance after mold release |
|---|---|---|---|---|---|---|---|---|
| Example 1 | 55 | 0 | 45 | 0 | $4.7 \times 10^6$ | 110 | 120 | ◯ |
| Example 2 | 55 | 0 | 0 | 45 | $5.3 \times 10^6$ | 110 | 120 | ◯ |
| Comparative Example 1 | 70 | 30 | 0 | 0 | $4.5 \times 10^5$ | 110 | 120 | X |
| Comparative Example 2 | 55 | 45 | 0 | 0 | $2.4 \times 10^6$ | 110 | 120 | X |

Evaluation

Figure 10:
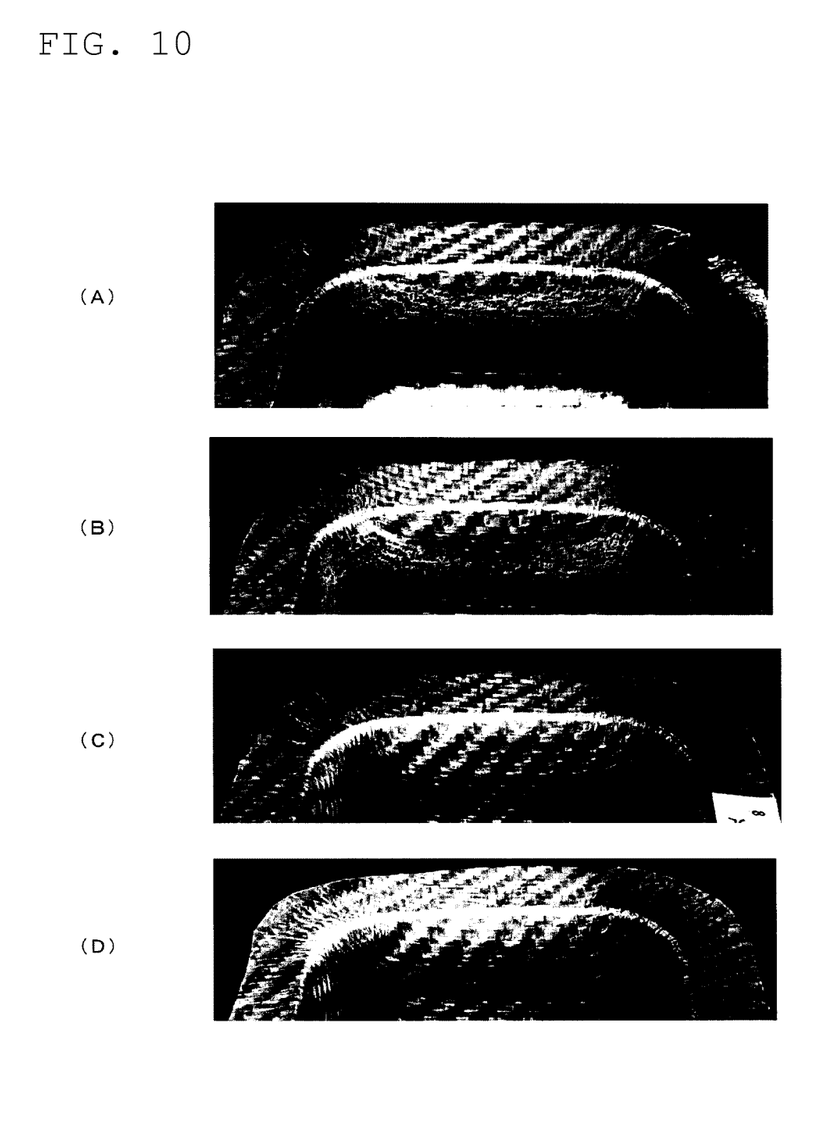
FIGS. 10(A) to 10(D) are photographs at the time of mold release of Examples of the present invention.

The photographs of the molded products after mold release obtained by molding the layered sheets of Examples and Comparative Examples listed in Table 1 are shown in FIG. 10.

In FIG. 10, FIG. 10(A) is a photograph after mold release of the molded product obtained by molding the layered sheet of Comparative Example 1, FIG. 10(B) is a photograph after mold release of the molded product obtained by molding the layered sheet of Comparative Example 2, FIG. 10(C) is a photograph after mold release of the molded product obtained by molding the layered sheet of Example 1, and FIG. 10(D) is a photograph after mold release of the molded product obtained by molding the layered sheet of Example 2.

As can be seen from Table 1 and the photographs after mold release in FIG. 10, it can be confirmed that when the coating layer having a thickness of 110 μm has a storage modulus at 150° C. of lower than $3.00 \times 10^6$ Pa, the coating layer floating occurred and the molded product had a distorted appearance (refer to FIG. 10(A) and FIG. 10(B)) when the mold release was performed at a temperature at mold release of 120° C.

In contrast, when the coating layer having a thickness of 110 μm has a storage modulus at 150° C. of $3.00 \times 10^6$ Pa or higher and $1.00 \times 10^8$ Pa or lower, the coating layer floating did not occur and the molded product having an excellent surface appearance was possible to be obtained (refer to FIG. 10(C) and FIG. 10(D)) even when the mold release was performed at a temperature at mold release of 120° C.

Therefore, it was able to be confirmed that the molded products having excellent surface appearance were possible to be obtained even at high temperature at mold release and as a result, the molding cycle time was possible to be shortened.

Example 3, Example 4, Comparative Example 3, and Comparative Example 4

In the production test of the molded products to produce the molded products from the layered sheets of Example 1, Example 2, Comparative Example 1, and Comparative Example 2, the molding conditions were changed as follows (the changes are described below), and the same conditions were applied to perform the experiment for Example 3, Example 4, Comparative Example 3, and Comparative Example 4.

Example 3

Using the layered sheet used in Example 1, the layered sheet was heated until the temperature of the surface of the layered sheet reached 170° C. in a constant-temperature oven in a state where the outer circumference of the layered sheet was gripped. Thereafter, the heated layered sheet was press-molded with a mold heated to 100° C. The mold was closed for 1.5 minutes, opened, and mold released to obtain a molded product.

Example 4

The layered sheet used in Example 2 was used to test in the same manner as in Example 3.

Comparative Example 3

The layered sheet used in Comparative Example 1 was used to test in the same manner as in Example 3.

Comparative Example 4

The layered sheet used in Comparative Example 2 was used to test in the same manner as in Example 3.

(Evaluation)

In the cases of Comparative Examples 3 and 4, the coating layer floating occurred and thus molded products had distorted appearance, which was the same as in the cases of Comparative Examples 1 and 2.

In contrast, in the cases of Examples 3 and 4, no coating layer floating occurred and thus molded products having excellent surface appearance were possible to be obtained, which was the same as the cases in Examples 1 and 2.

Therefore, it was able to be confirmed that the molded products having excellent surface appearance were possible be obtained even at high temperature at mold release and as a result, the molding cycle time was possible to be shortened.

EXPLANATIONS OF LETTERS OR NUMERALS

1 Strand
100 Base Layer
101 Surface Layer
102 Low Melting Point Part
2 Cloth
3 Coating Layer
4 Adhesion Layer
5 Top Layer
6 Adhesive Layer
7 Polar Group-Containing Thermoplastic Resin Layer
8 Press Machine
81 Male Mold
82 Female Mold
83 Layered Sheet
84 Correction Mold

The invention claimed is:

1. A layered sheet
formed by layering a plurality of cloths comprised of thermoplastic resin strands into a stack of cloths and
formed by layering a coating layer comprised of a thermoplastic resin onto at least one outer surface of the stack of cloths, wherein
the thermoplastic resin is comprised of the same component as the strands and has a thickness of 0.02 mm or more and 1.0 mm or less, and
a storage modulus of the coating layer at 150° C. is $3.00 \times 10^6$ Pa or higher and $1.00 \times 10^8$ Pa or lower.

2. The layered sheet according to claim 1, wherein the cloths are formed by layering through an adhesion layer comprised of the same component as the cloths.

3. The layered sheet according to claim 1, wherein a top layer comprised of a thermoplastic resin having a thickness of 0.02 mm or more and 0.1 mm or less is layered onto an upper surface of said coating layer.

4. The layered sheet according to claim 1, wherein a top layer comprised of a thermoplastic resin having a thickness of 0.02 mm or more and 0.1 mm or less is layered onto an upper surface of said coating layer through an adhesive layer.

5. The layered sheet of claim 1, wherein the coating layer is layered directly onto the stack of cloths, with no intervening layers between the coating layer and the stack of cloths.

6. The layered sheet according to claim 2, wherein a top layer comprised of a thermoplastic resin having a thickness of 0.02 mm or more and 0.1 mm or less is layered onto an upper surface of said coating layer.

7. The layered sheet according to claim 2, wherein a top layer comprised of a thermoplastic resin having a thickness of 0.02 mm or more and 0.1 mm or less is layered onto an upper surface of said coating layer through an adhesive layer.

8. A method for producing a layered sheet molded product, the method comprising:
press-molding the layered sheet according to claim 1 using a male-female mold press machine;
subsequently mold-releasing a molded product obtained by the molding at a molded product temperature in a range of 70° C. or higher and 120° C. or lower; and
subsequently lowering the molded product temperature to 60° C. or lower.

9. The method for producing a layered sheet molded product according to claim 8, wherein the lowering the molded product temperature to 60° C. or lower is performed in a state of retaining a shape along a correction mold.

10. The method for producing a layered sheet molded product according to claim 8, wherein the lowering the molded product temperature to 60° C. or lower is performed while the molded product is being attached to a male mold of the male-female mold press machine.

11. A method for producing a layered sheet molded product, the method comprising:
press-molding the layered sheet according to claim 2 using a male-female mold press machine;
subsequently mold-releasing a molded product obtained by the molding at a molded product temperature in a range of 70° C. or higher and 120° C. or lower; and
subsequently lowering the molded product temperature to 60° C. or lower.

12. The method for producing a layered sheet molded product according to claim 11, wherein the lowering the molded product temperature to 60° C. or lower is performed in a state of retaining a shape along a correction mold.

13. The method for producing a layered sheet molded product according to claim 11, wherein the lowering the molded product temperature to 60° C. or lower is performed while the molded product is being attached to a male mold of the male-female mold press machine.

14. A method for producing a layered sheet molded product, the method comprising:
press-molding the layered sheet according to claim 3 using a male-female mold press machine;
subsequently mold-releasing a molded product obtained by the molding at a molded product temperature in a range of 70° C. or higher and 120° C. or lower; and
subsequently lowering the molded product temperature to 60° C. or lower.

15. The method for producing a layered sheet molded product according to claim 14, wherein the lowering the molded product temperature to 60° C. or lower is performed in a state of retaining a shape along a correction mold.

16. The method for producing a layered sheet molded product according to claim 14, wherein the lowering the molded product temperature to 60° C. or lower is performed while the molded product is being attached to a male mold of the male-female mold press machine.

17. A method for producing a layered sheet molded product, the method comprising:
press-molding the layered sheet according to claim 4 using a male-female mold press machine;
subsequently mold-releasing a molded product obtained by the molding at a molded product temperature in a range of 70° C. or higher and 120° C. or lower; and
subsequently lowering the molded product temperature to 60° C. or lower.

18. The method for producing a layered sheet molded product according to claim 17, wherein the lowering the molded product temperature to 60° C. or lower is performed in a state of retaining a shape along a correction mold.

19. The method for producing a layered sheet molded product according to claim 17, wherein the lowering the molded product temperature to 60°° C. or lower is performed while the molded product is being attached to a male mold of the male-female mold press machine.

* * * * *